United States Patent
Hoshino

(10) Patent No.: US 12,348,094 B2
(45) Date of Patent: Jul. 1, 2025

(54) RESOLVER STATOR

(71) Applicant: PANASONIC INTELLECTUAL PROPERTY MANAGEMENT CO., LTD., Osaka (JP)

(72) Inventor: Yuki Hoshino, Gunma (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 245 days.

(21) Appl. No.: 18/099,050

(22) Filed: Jan. 19, 2023

(65) Prior Publication Data

US 2023/0246530 A1    Aug. 3, 2023

(30) Foreign Application Priority Data

Jan. 28, 2022 (JP) .................. 2022-012416

(51) Int. Cl.
  *H02K 24/00*    (2006.01)
  *H02K 3/00*     (2006.01)
  *H02K 11/225*   (2016.01)

(52) U.S. Cl.
  CPC .......... *H02K 24/00* (2013.01); *H02K 11/225* (2016.01)

(58) Field of Classification Search
  CPC ........ H02K 11/225; H02K 24/00; H02K 3/00; H02K 3/18; G01D 5/20; G01D 5/24; G01D 5/245
  See application file for complete search history.

(56) References Cited

U.S. PATENT DOCUMENTS 3,041,486 A * 6/1962 Moffitt .................. H02K 19/20
                                                 336/135
2017/0141663 A1* 5/2017 Abe ....................... H02K 24/00

FOREIGN PATENT DOCUMENTS

| CN | 102967320 A | * | 3/2013 | ............ H02K 24/00 |
| EP | 3208920 | | 8/2017 | |
| JP | 3313639 | | 5/2002 | |
| JP | 2017-143630 | | 8/2017 | |
| JP | 6617236 | | 11/2019 | |

* cited by examiner

*Primary Examiner* — Tran N Nguyen
(74) *Attorney, Agent, or Firm* — Greenblum & Bernstein, P.L.C.

(57) ABSTRACT

A resolver stator is a resolver stator to be applied to a variable reluctance resolver. The resolver stator includes a plurality of magnetic poles and three winding wires (an excitation winding wire, a first detection winding wire, and a second detection winding wire). The plurality of magnetic poles are annularly arranged in an alignment. Each of the three winding wires is wound around each of the plurality of magnetic poles while being circulated along the alignment of the plurality of magnetic poles. One of the clockwise direction and the counterclockwise direction is the first turning direction, and the other of the clockwise direction and the counterclockwise direction is the second turning direction. At least one winding wire of the three winding wires wraps around each of the plurality of magnetic poles in a second turning direction while orbiting along the plurality of magnetic poles in the first turning direction.

7 Claims, 11 Drawing Sheets

RESOLVER STATOR

CROSS-REFERENCE TO RELATED APPLICATION

The present application is based upon and claims the benefit of priority to Japanese Patent Application No. 2022-012416, filed on Jan. 28, 2022, the entire contents of which are incorporated herein by reference.

TECHNICAL FIELD

The present disclosure relates to resolver stators. The present disclosure specifically relates to a resolver stator to be applied to a variable reluctance resolver configured to detect the rotational velocity of, for example, motors.

BACKGROUND ART

A resolver stator described in Literature 1 (JP 2017-143630 A) includes: a plurality of coils wound around respective teeth (magnetic poles); and a connecting wire electrically connecting the plurality of coils to each other. The plurality of coils and the connecting wire are made up of a single winding wire. The single winding wire is clockwise wound around each tooth while being clockwise circulated along an alignment of the plurality of teeth.

In the resolver stator described in Literature 1, the single winding wire is clockwise wound around each tooth while being clockwise circulated along an alignment of the plurality of teeth. In this case, in each tooth, a connecting wire part on a winding start side of the single winding wire and a connecting wire part on a winding end side of the single winding wire may cross each other, and the single winding wire may be cut at the crossing part.

SUMMARY

In view of the foregoing, it is an object of the present disclosure to provide a resolver stator in which a connecting wire part on a winding start side of a winding wire and a connecting wire part on a winding end side of the winding wire are prevented from crossing each other at each of magnetic poles.

A resolver stator of an aspect of the present disclosure is a resolver stator to be applied to a variable reluctance resolver. The resolver stator includes a plurality of magnetic poles, an excitation winding wire, a first detection winding wire, and a second detection winding wire. The plurality of magnetic poles are annularly arranged in an alignment. Each of the excitation winding wire, the first detection winding wire, and the second detection winding wire is wound around each of the plurality of magnetic poles while being circulated along the alignment of the plurality of magnetic poles. One of a clockwise direction and a counterclockwise direction is a first turning direction, and the other of the clockwise direction and the counterclockwise direction is a second turning direction. At least one winding wire of the excitation winding wire, the first detection winding wire, or the second detection winding wire is wound around each of the plurality of magnetic poles in the second turning direction while being circulated along the alignment of the plurality of magnetic poles in the first turning direction.

BRIEF DESCRIPTION OF THE DRAWINGS

The figures depict one or more implementation in accordance with the present teaching, by way of example only, not by way of limitations. In the figures, like reference numerals refer to the same or similar elements.

DETAILED DESCRIPTION

Embodiment

(1) Overall Configuration

A resolver stator 1 according to an embodiment will be described in detail with reference to the drawings. A configuration described in the embodiment is a mere example of the present disclosure. The present disclosure is not limited to the embodiment, and various modifications may be made in accordance with design and the like without departing from the technical idea of the present disclosure.

The resolver stator 1 according to the present embodiment can be used as a stator of a resolver configured to detect a rotational position (rotational angle) of a motor (e.g., a motor for a power source) used in, for example, an electric vehicle or a hybrid vehicle. More specifically, the resolver stator 1 is configured to detect the rotational position (rotational angle) of the motor by detecting a rotational position (rotational angle) of a rotor concentrically fixed to a rotational axis of the motor. That is, the resolver stator 1, together with the rotor, constitutes the resolver.

In the present embodiment, the resolver stator 1 is assumed to be a variable reluctance resolver stator but may be assumed to be a resolver stator that is not a variable reluctance type. The variable reluctance resolver stator is a resolver stator including a winding wire wound only around the stator of the stator and the rotor.

Figure 1:
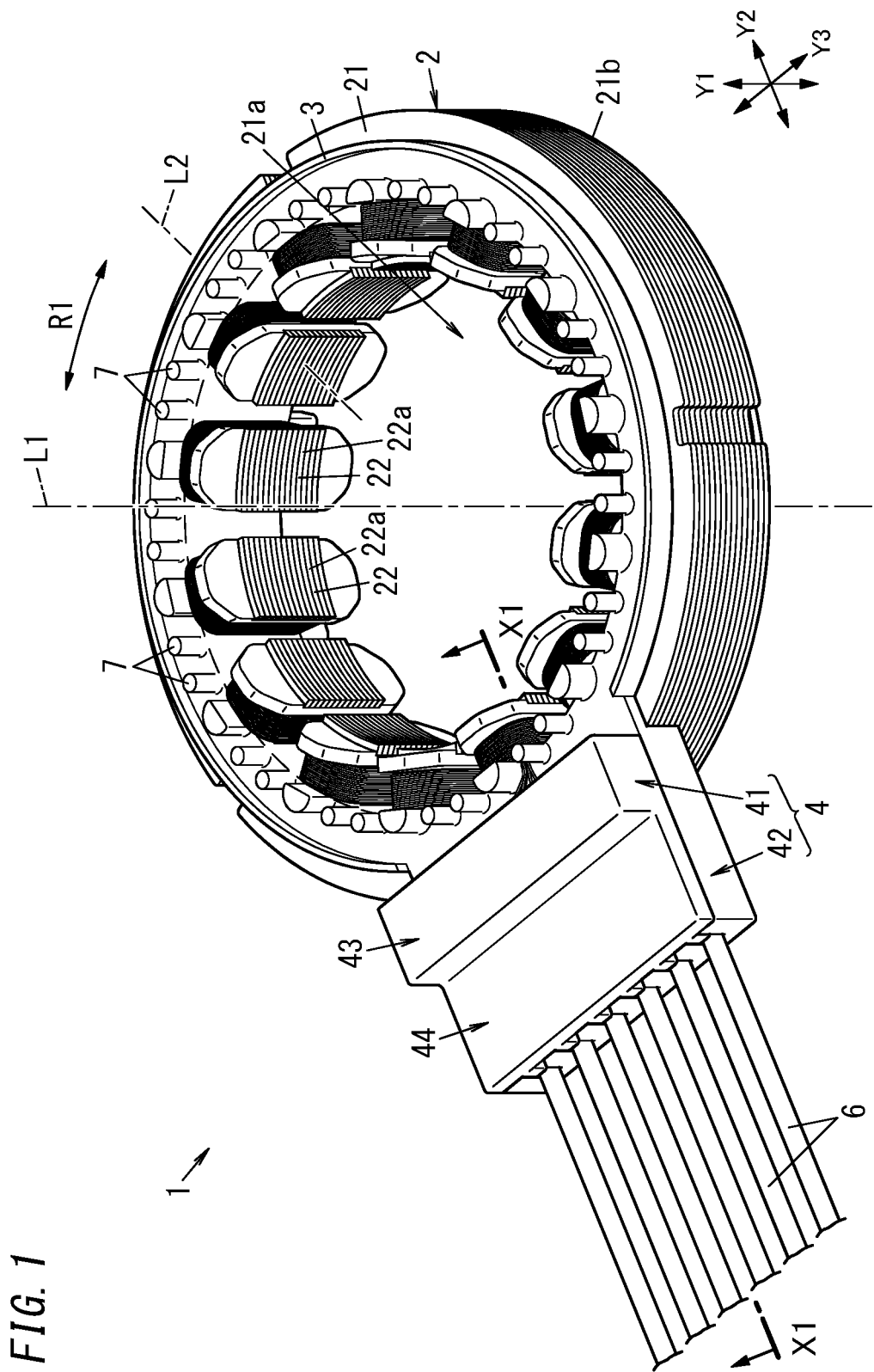
FIG. 1 is a perspective view of a resolver stator according to an embodiment.
Figure 2:
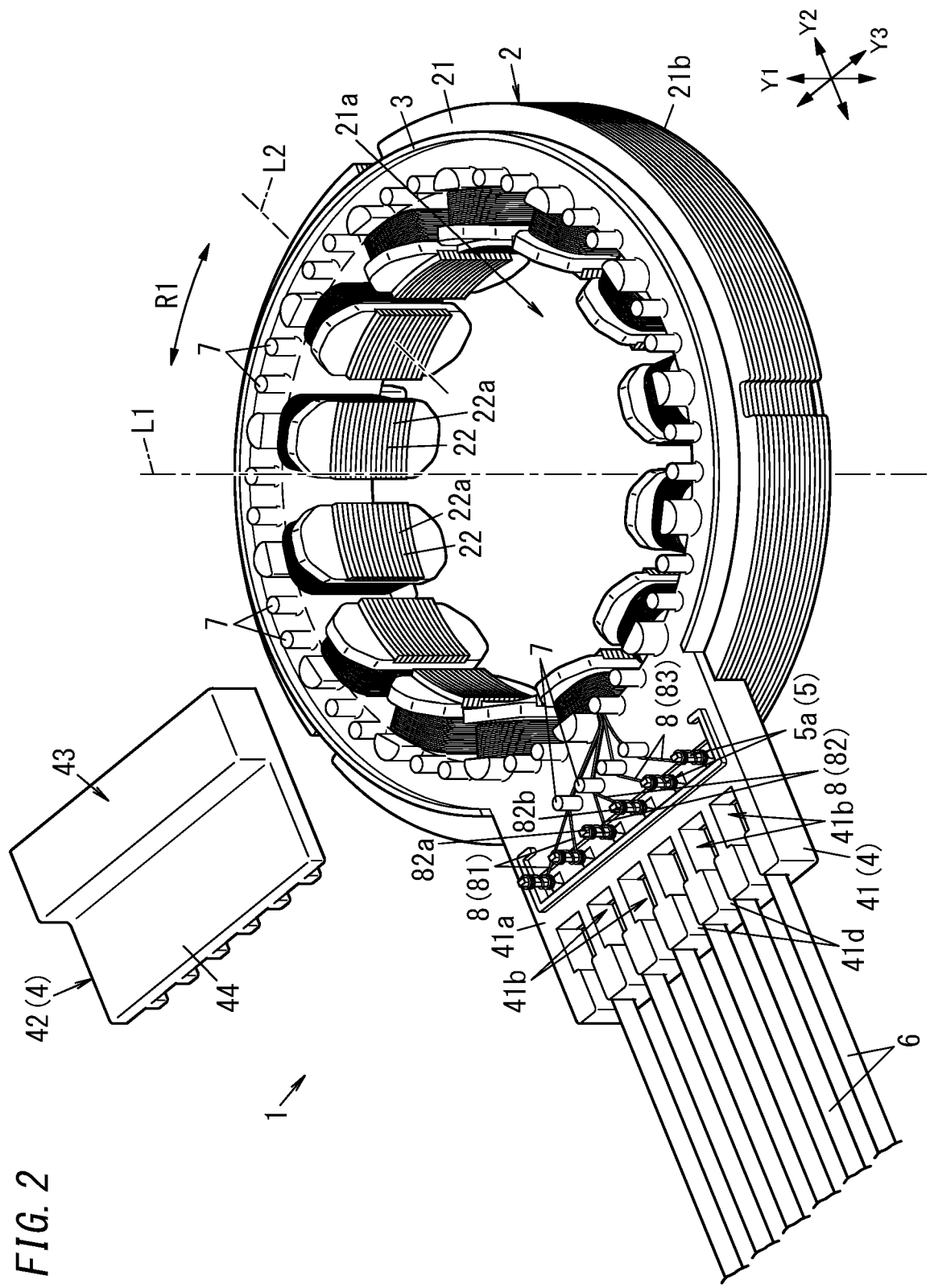
FIG. 2 is a partially exploded perspective view of the resolver stator.

As shown in FIG. 1, the resolver stator 1 includes a stator body 2, an insulator 3, a terminal holder 4, a plurality of (e.g., six) relay terminals 5 (see FIG. 3), a plurality of (e.g., six) covered electric wires 6, a plurality of guide projections 7, and a plurality of (e.g., three) winding wires 8 (see FIG. 2). In the present embodiment, the plurality of covered electric wires 6 are constituent elements of the resolver stator 1. However, the plurality of covered electric wires 6 do not have to be the constituent elements.

The stator body 2 includes an annular part 21 and a plurality of magnetic poles 22. The annular part 21 is a part that supports the plurality of magnetic poles 22 and has, for example, a circularly annular shape. The annular part 21 has an opening 21a that is circular in plan view. The opening 21a penetrates the center of the annular part 21 in a direction of a central axis L1 of the annular part 21.

Each of the plurality of magnetic poles 22 is a part around which the plurality of winding wires 8 (e.g., magnet wires) are wound. The plurality of magnetic poles 22 are disposed on an inner circumferential surface in the opening 21a of the annular part 21. The plurality of magnetic poles 22 are arranged on the inner circumferential surface in the opening 21a at equal intervals along a circumferential direction R1 of the annular part 21.

The magnetic poles 22 protrude from the inner circumferential surface in the opening 21a toward the center of the opening 21a. The magnetic poles 22 have respective tip ends extending in the circumferential direction R1 of the annular part 21. That is, the magnetic pole 22 is substantially T-shaped in a plan view when viewed in the direction of the central axis L1.

The annular part 21 and the plurality of magnetic poles 22 are made of metal (e.g., ferromagnetic metal such as iron). The annular part 21 and the plurality of magnetic poles 22 are integrally formed as one piece. The stator body 2 is formed, for example, by laminating a plurality of metal sheet having an overall contour (a contour viewed in the direction of the central axis L1) of the one piece integrally constituted by the annular part 21 and the plurality of magnetic poles 22.

The insulator 3 is provided on a surface of the stator body 2, for example, such that an outer circumferential surface 21b of the annular part 21 and tip surfaces 22a of the plurality of magnetic poles 22 are exposed. That is, the insulator 3 covers an inner circumferential surface, an upper surface (more specifically, an inner circumferential edge part of an upper surface), and a lower surface (more specifically, an inner circumferential edge part of a lower surface) of the annular part 21, and an outer peripheral surface of each magnetic pole 22. The insulator 3 is formed from an insulation member (e.g., a synthetic resin) having an insulating property.

The terminal holder 4 holds the plurality of relay terminals 5. The terminal holder 4 is disposed on an outer circumferential surface of the stator body 2 and projects radially outward from the stator body 2 (i.e., radially outward from the annular part 21). The terminal holder 4 is formed from an insulation member (e.g., a synthetic resin) having an insulating property in the shape of a block of a rectangular parallelepiped. The terminal holder 4 may be formed integrally with the insulator 3.

A thickness direction Y1, a length direction Y2, and a width direction Y3 of the terminal holder 4 are defined as shown in FIG. 1. The thickness direction Y1 is a direction parallel to the central axis L1. The length direction Y2 is a direction in which the terminal holder 4 protrudes from the annular part 21 along the radial direction of the annular part 21. The width direction Y3 is a direction orthogonal to the thickness direction Y1 and the length direction Y2 of the terminal holder 4.

In the length direction Y2, at the side of the stator body 2 is referred to as an "inner side", and a side away from the side of the stator body 2 is referred to as an "outer side". In the thickness direction Y1, a direction in which winding wire connection parts 5a to be described later protrude is referred to as an "upper side", and an opposing side thereof is referred to as a "lower side".

More specifically, the terminal holder 4 includes a body 41 and a lid 42 as shown in FIG. 2.

The body 41 is disposed on the outer circumferential surface of the stator body 2 and projects radially outward from the stator body 2 (i.e., radially outward from the annular part 21). The body 41 has, for example, a rectangular flat plate shape. The body 41 has a first main surface 41a and a second main surface which face each other in the thickness direction Y1.

On the first main surface 41a of the body 41, the plurality of winding wire connection parts 5a are arranged. The plurality of winding wire connection parts 5a are arranged side by side along the width direction Y3 on the first main surface 41a of the body 41. Each of the plurality of winding wire connection parts 5a is configured such that one end portion of a corresponding one of the plurality of relay terminals 5 is exposed in a protruding manner from the first main surface 41a of the body 41. Each of the plurality of winding wire connection parts 5a may hereinafter be referred to as one end portion 5a of the corresponding one of the plurality of relay terminals 5.

The first main surface 41a of the body 41 has a plurality of insertion recesses 41b into which respective one end portions 6a (see FIG. 3) of the plurality of covered electric wires 6 are inserted. Each of the plurality of insertion recesses 41b is extended along the length direction Y2 from a central portion of the body 41 in the length direction Y2 to a tip surface (outer end surface) of the body 41 in the length direction Y2. One end portion (outer end portion) of each insertion recess 41b is open at an opening 41d of the tip surface of the body 41. The plurality of insertion recesses 41b are arranged in the body 41 side by side in the width direction Y3.

The lid 42 is a member that covers the first main surface 41a of the body 41. The lid 42 includes a first lid part 43 and a second lid part 44. The first lid part 43 is disposed to cover the inner half of the first main surface 41a and covers the plurality of winding wire connection parts 5a exposed from the first main surface 41a. The first lid part 43 has, for example, a box shape (e.g., is in the shape of a box of a rectangular parallelepiped) having a lower main surface and an inner side surface which are open. The second lid part 44 is disposed to cover the outer half of the first main surface 41a of the body 41 and covers upper surface openings of the insertion recesses 41b. The second lid part 44 protrudes in the length direction Y2 from a lower part of an outer side surface of the first lid part 43.

Figure 3:
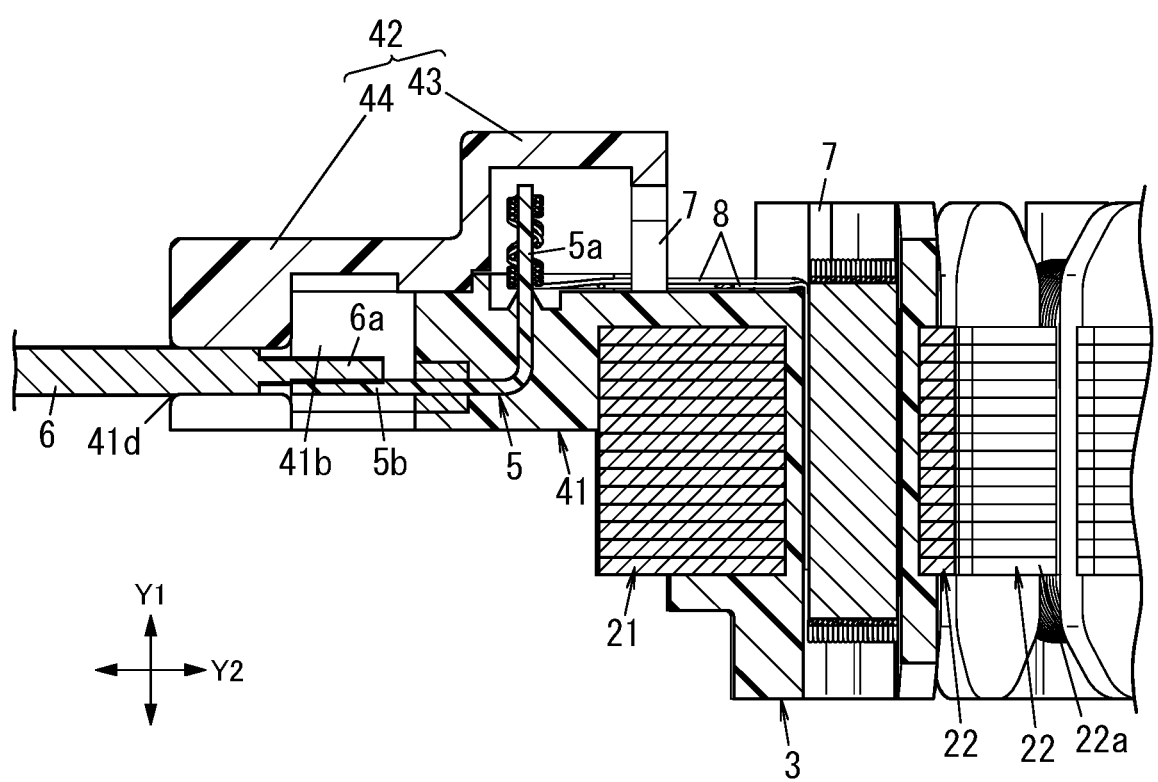
FIG. 3 is a sectional view taken along line X1-X1 of FIG. 1.

The plurality of relay terminals 5 are formed from a conductive member (e.g., a metallic member) having conductivity. The plurality of relay terminals 5 are terminals that relay the plurality of winding wires 8 wound around each of the plurality of magnetic poles 22 to the plurality of covered electric wires 6. As shown in FIG. 3, the plurality of relay terminals 5 are disposed in the terminal holder 4.

The one end portion 5a of each of the plurality of relay terminals 5 protrudes from the first main surface 41a of the terminal holder 4 and serves as a winding wire connection part. The other end portion 5b of each of the plurality of relay terminals 5 protrudes into a corresponding one of the plurality of insertion recesses 41b of the terminal holder 4 and serves as an electric wire connection part. The plurality of relay terminals 5 are arranged side by side along the width direction Y3 of the terminal holder 4.

The one end portion (i.e., the winding wire connection part) 5a of each of the plurality of relay terminals 5 is electrically connected to one of both ends of a corresponding one of the plurality of winding wires 8 wound around the plurality of magnetic poles 22 (see FIG. 2). The other end portion (i.e., the electric wire connection part) 5b of each of the plurality of relay terminals 5 is electrically connected to the one end portion 6a of a corresponding one of the plurality of covered electric wires 6 in the terminal holder 4 (see FIG. 2).

The plurality of covered electric wires 6 are electric wires for electrically connecting an external device to the plurality of relay terminals 5. Each covered electric wire 6 includes a conductor and a covering portion covering the conductor. The covering portion is an insulation member, such as a vinyl resin, having an electrically insulating property and is an outer cover provided to cover the outer periphery of the conductor.

The one end portion 6a of each of the plurality of covered electric wires 6 is inserted in the terminal holder 4 and is electrically connected to the other end portion (electric wire connection part) 5b of a corresponding one of the plurality of relay terminals 5. In the present embodiment, the one end portion 6a of each of the plurality of covered electric wires 6 is connected to the other end portion 5b of the corresponding one of relay terminals 5 in the state of the covering portion being peeled off such that the conductor is exposed.

The plurality of guide projections 7 are projections for guiding the plurality of winding wires 8 such that the winding wires 8 are routed along predetermined paths. The plurality of guide projections 7 are provided on an upper surface of the insulator 3 and an upper surface of the body 41. More specifically, the guide projections 7 are disposed one on each side of each magnetic pole 22 on an inner circumferential edge of the upper surface of the insulator 3. On the upper surface of the body 41, for example, four guide projections 7 are also disposed along the width direction Y3 between the stator body 2 and the plurality of winding wire connection parts 5a.

The plurality of winding wires 8 are an excitation winding wire 81, a first detection winding wire 82, and a second detection winding wire 83. The excitation winding wire 81 is a winding wire to which an alternating-current voltage is input from the external device. Each of the first detection winding wire 82 and the second detection winding wire 83 is a winding wire for outputting, to the external device, an induced voltage induced by the alternating-current voltage input to the excitation winding wire 81. The first detection winding wire 82 is one winding wire of a sin phase winding wire for detecting a sin phase of the induced voltage and a cos phase winding wire for detecting a cos phase of the induced voltage. The second detection winding wire 83 is the other winding wire of the sin phase winding wire and the cos phase winding wire.

Each winding wire 8 is wound around each magnetic pole 22 while being circulated along the alignment of the plurality of magnetic poles 22 (more specifically, along the plurality of guide projections 7 arranged on the inner circumferential edge of the upper surface of the insulator 3). Both ends of the plurality of winding wires 8 correspond to the plurality of winding wire connection parts 5a on a one-to-one basis and are connected to the corresponding winding wire connection parts 5a.

In the present embodiment, the excitation winding wire 81 is, first of all, wound around each magnetic poles 22 while being circulated along the alignment of the plurality of magnetic poles 22. The first detection winding wire 82 is then wound around each magnetic pole 22 while being circulated along the alignment of the plurality of magnetic poles 22. Finally, the second detection winding wire 83 is wound around each magnetic pole 22 while being circulated along the alignment of the plurality of magnetic poles 22.

That is, each magnetic pole 22 is laminated with a winding wire layer formed by winding the excitation winding wire 81, a winding wire layer formed by winding the first detection winding wire 82, and a winding wire layer formed by winding the second detection winding wire 83 in this order from inside to outside.

Of each winding wire 8, winding wire parts wound around the respective magnetic poles 22 constitute coils. Further, of each winding wire 8, winding wire parts connecting adjacent coils and winding wire parts connecting respective coils to the winding wire connection parts 5a constitute connecting wires.

When each winding wire 8 is routed from one magnetic pole 22 to a next magnetic pole 22, the connecting wire between the one magnetic pole 22 and the next magnetic pole 22 is routed on an outer side (i.e., outer side provided that a center side of the stator body 2 is defined as an inner side) of the guide projections 7 between the one magnetic pole 22 and the next magnetic pole 22. This enables the connecting wire between the one magnetic pole and the next magnetic pole 22 to be prevented from loosening.

The resolver stator 1 includes a rotor disposed in the opening 21a of the annular part 21. The rotor rotates as the motor to be detected rotates while an alternating-current voltage is applied to the excitation winding wire 81. Along with the rotation, a detection voltage is generated in each of the first detection winding wire 82 and the second detection winding wire 83.

The detection voltage generated in the first detection winding wire 82 is output to the external device through corresponding relay terminals 5 and corresponding covered electric wires 6. The detection voltage generated in the second detection winding wire 83 is output to the external device through corresponding relay terminals 5 and corresponding covered electric wires 6. Then, in the external device, the rotational position (rotational angle) of the motor is detected based on the detection voltage from each of the first detection winding wire 82 and the second detection winding wire 83.

(2) Details of how to Wind Three Winding Wires 8

(2-1) Overall Description

With reference to FIGS. 4A to 6, how to wind the three winding wires 8 (the excitation winding wire 81, the first detection winding wire 82, and the second detection winding wire) will be described.

Figure 4A:
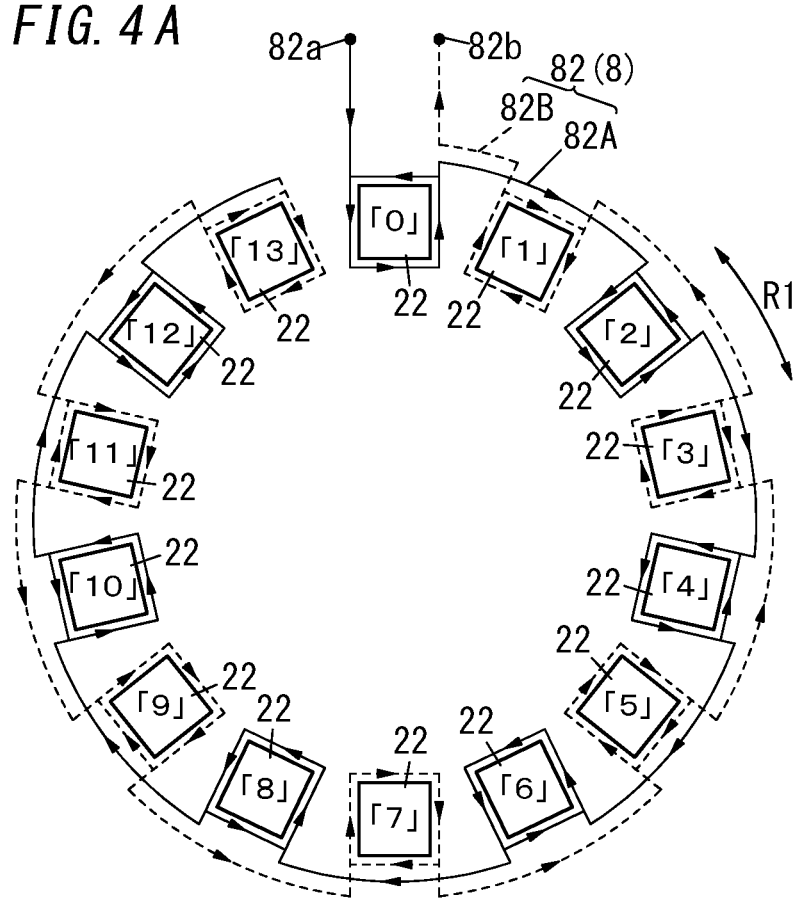
FIG. 4A is a view illustrating how a winding wire is wound around a plurality of magnetic poles of the resolver stator.

FIG. 4A shows the arrangement of the plurality of (in the example shown in FIG. 4A, fourteen) magnetic poles 22 as viewed along the central axis L1 of the annular part 21. In FIG. 4A, the plurality of magnetic poles 22 are circularly aligned. In FIG. 4A, each magnetic pole 22 is shown in the shape of a quadrilateral. This quadrilateral represents the shape of a cross section of each magnetic pole 22 when viewed in a cross section orthogonal to a central axis L2 of the magnetic pole 22 (an axis parallel to the radius of the annular part 21) and is a regular quadrilateral in the example shown in FIG. 4A.

Numerical digits ("0" to "13") in the quadrilaterals representing the respective magnetic poles 22 shown in 4A are numbers (magnetic pole numbers) for distinguishing the magnetic poles from one another. In the following description, the magnetic pole having the number M (M=0, 1, 2 . . . ) is referred to as the Mth magnetic pole 22. In the example shown in FIG. 4A, a 0th magnetic pole 22 to a 13th magnetic pole 22 are clockwise aligned in this order in a circular shape.

The excitation winding wire 81, the first detection winding wire 82, and the second detection winding wire 83 are wound basically in the same manner Therefore, in the following description, how to wind the first detection winding wire 82 will be described as an example, and the description of how to wind the excitation winding wire 81 and the second detection winding wire 83 will be omitted. In the following description, a first turning direction is clockwise, and a second turning direction is counterclockwise.

The first detection winding wire 82 has one end portion 82a connected to a corresponding one of the winding wire connection parts 5a. The first detection winding wire 82 is, first of all, wound around each magnetic pole 22 from the 0th magnetic pole 22 (first magnetic pole) to the 13th magnetic pole 22 (last magnetic pole) in a winding direction which is the second turning direction while being circulated along the alignment of the plurality of magnetic poles 22 (i.e., along the circumferential direction R1 of the annular part 21) in a circulation direction which is the first turning direction as indicated by a solid line 82A. The first detection winding wire 82 then comes to the 13th magnetic pole 22 (last magnetic pole).

The first detection winding wire 82 turns back and is then wound around each magnetic pole 22 from the 13th magnetic pole 22 to the 0th magnetic pole 22 in a winding direction which is the first turning direction while being circulated along the alignment of the plurality of magnetic poles 22 in a circulation direction which is the second turning direction as indicated by a dashed line 82B.

In the example shown in FIG. 4A, the first detection winding wire 82 is, first of all, wound a 0th predetermined number of turns around the 0th magnetic pole 22 in the winding direction which is the second turning direction, and circulates along the alignment of the plurality of magnetic poles 22 to the 2nd magnetic pole 22, while skipping the 1st magnetic pole 22, in the circulation direction which is the first turning direction.

Then, the first detection winding wire 82 is wound a 2nd predetermined number of turns around the 2nd magnetic pole 22 in the winding direction which is the second turning direction, and circulates along the alignment of the plurality of magnetic poles 22 to the 4th magnetic pole 22, while skipping the 3rd magnetic pole 22, in the circulation direction which is the first turning direction. In this way, the first detection winding wire 82 is wound a predetermined number of turns around every other magnetic pole 22 in the first turning direction from the 0th magnetic pole 22 to the 13th magnetic pole 22.

Then, the first detection winding wire 82 turns back at the 13th magnetic pole 22 and is wound a 13th predetermined number of turns around the 13th magnetic pole 22 in the winding direction which is the first turning direction. Then, the first detection winding wire 82 circulates along the alignment of the plurality of magnetic poles 22 to the 11th magnetic pole 22, while skipping the 12th magnetic pole 22, in the circulation direction which is the second turning direction. Thereafter, the first detection winding wire 82 is wound an 11th predetermined number of turns around the 11th magnetic pole 22 in the winding direction which is the first turning direction, and circulates along the alignment of the plurality of magnetic poles 22 to the 9th magnetic pole 22, while skipping the 10th magnetic pole 22, in the circulation direction which is the second turning direction.

In this way, the first detection winding wire 82 is wound a predetermined number of turns around every other magnetic pole 22 of the plurality of magnetic poles 22 in the second turning direction from the 13th magnetic pole 22 to the 0th magnetic pole 22. That is, when circulating along the dashed line 82B, the first detection winding wire 82 is wound around the magnetic poles 22 that are skipped when the first detection winding wire 82 circulates along the solid line 82A. The other end portion 82b of the first detection winding wire 82 is connected to a corresponding one of the winding wire connection parts 5a.

Figure 4B:
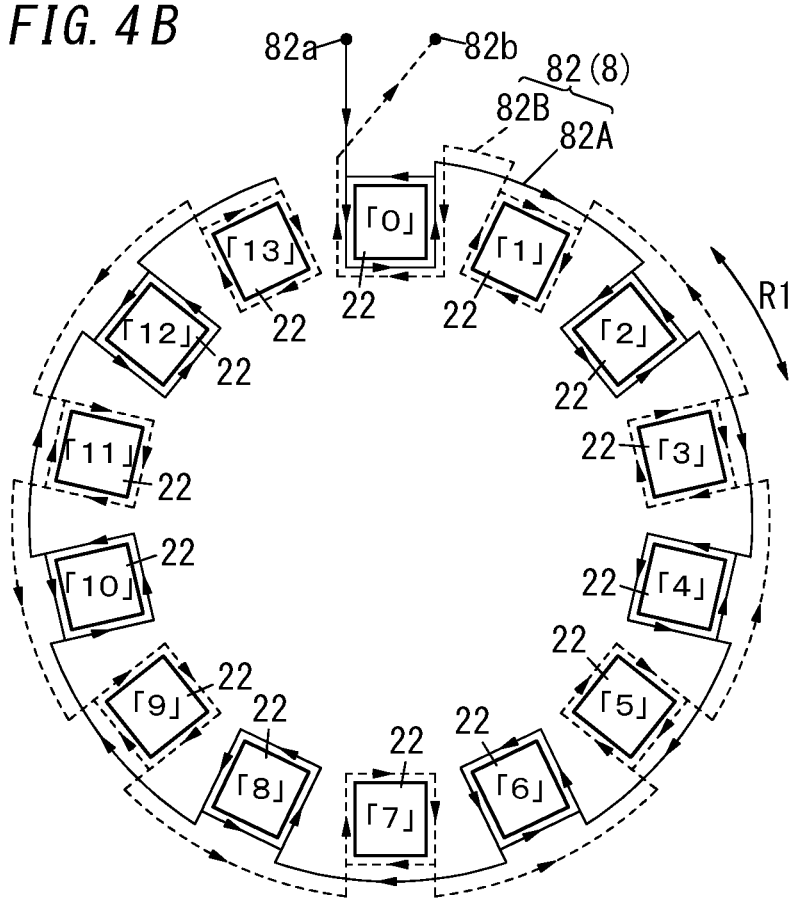
FIG. 4B is an illustrative view of a variation of how a winding wire is wound around the plurality of magnetic poles of the resolver stator.

Note that FIG. 4A shows an example in which when the other end portion 82b of the first detection winding wire 82 is connected to the corresponding one of the winding wire connection parts 5a, the other end portion 82b is connected to the corresponding one of the winding wire connection parts 5a from the 1st magnetic pole 22 after the first detection winding wire 82 is wound around the 1st magnetic pole 22. However, for example, as shown in FIG. 4B, when the other end portion 82b of the first detection winding wire 82 is connected to the corresponding one of the winding wire connection parts 5a, the other end portion 82b may be connected from the 0th magnetic pole 22 to the corresponding one of the winding wire connection parts 5a after the first detection winding wire 82 circulates to the 0th magnetic pole 22 along the circumferential direction R1 and is wound a predetermined number of turns (e.g., a ¾ turn) around the 0th magnetic pole 22 in the first turning direction. The detailed meaning of the "wound a ¾ turn" will be described later.

In the example shown in FIG. 4A, when circulating along the solid line 82A, the first detection winding wire 82 is wound around every other magnetic pole 22 but may be wound around every two magnetic pole 22 or may be sequentially wound around every magnetic pole 22. Similarly, when circulating along the dashed line 82B, the first detection winding wire 82 is wound around every other magnetic pole 22 but may be wound around every two magnetic pole 22 or may be sequentially wound around every magnetic pole 22.

In this case, the electromagnetic inductive number of turns of the first detection winding wire 82 wound around each magnetic pole 22 (i.e., the number of turns contributing to the inductive voltage) is given by a difference between the number of turns indicated by the solid line 82A (i.e., the number of turns in the second turning direction at the magnetic pole 22) (e.g., A2) and the number of turns indicated by the dashed line 82B (i.e., the number of turns in the first turning direction at the magnetic pole 22)(e.g., A1). Specifically, the difference is obtained, for example, by defining the number of turns A1 in the case of winding in the first turning direction around the magnetic pole 22 as the "+" number of turns (+A1) and the number of turns A2 in the case of winding in the second turning direction around the magnetic pole 22 as the "−" number of turns (−A2) and by taking an algebraic sum ((+A1)+(−A2)) of the "+" number of turns (+A1) and the "−" number of turns (−A2).

That is, in the present embodiment, the first detection winding wire 82 includes a first winding wire part 82A and a second winding wire part 82B. The first winding wire part 82A is a part that is wound around each of the plurality of magnetic poles 22 in the winding direction which is the second turning direction while being circulated along the alignment of the plurality of magnetic poles 22 in the circulation direction which is the first turning direction along the solid line 82A. The second winding wire part 82B is a part that is wound around each of the plurality of magnetic poles 22 in the winding direction which is the first turning direction while being circulated along the alignment of the plurality of magnetic poles 22 in the circulation direction which is the second turning direction along the dashed line 82B.

The number of turns of the first detection winding wire 82 around each magnetic pole 22 is obtained by defining the number of turns of the first winding wire part 82A as the "−" number of turns and the number of turns of the second winding wire part 82B as the "+" number of turns and by taking an algebraic sum of the "−" number of turns and the "+" number of turns. In the present embodiment, winding is performed such that the number of turns of the first detection winding wire 82 around each magnetic pole 22 corresponds to a target number of turns determined based on a theoretical value (the theoretically calculated number of turns).

The first detection winding wire 82 is circulated along the alignment of the plurality of magnetic poles 22 in the first turning direction from the 0th magnetic pole 22 (first magnetic pole) to the 13th magnetic pole 22 (last magnetic pole). Then, to return from the 13th magnetic pole 22 to the 0th magnetic pole 22, the first detection winding wire 82 is not circulated in the first turning direction but circulates in the second turning direction. As a result, the first detection winding wire 82 does not form a closed ring along the alignment of the plurality of magnetic poles 22.

This prevents induced electromotive force due to a closed ring formed by the first detection winding wire 82 along the alignment of the plurality of magnetic poles 22 from being generated. As a result, the induced electromotive force is prevented from affecting respective output signals of the first detection winding wire and the second detection winding wire.

Figure 5:
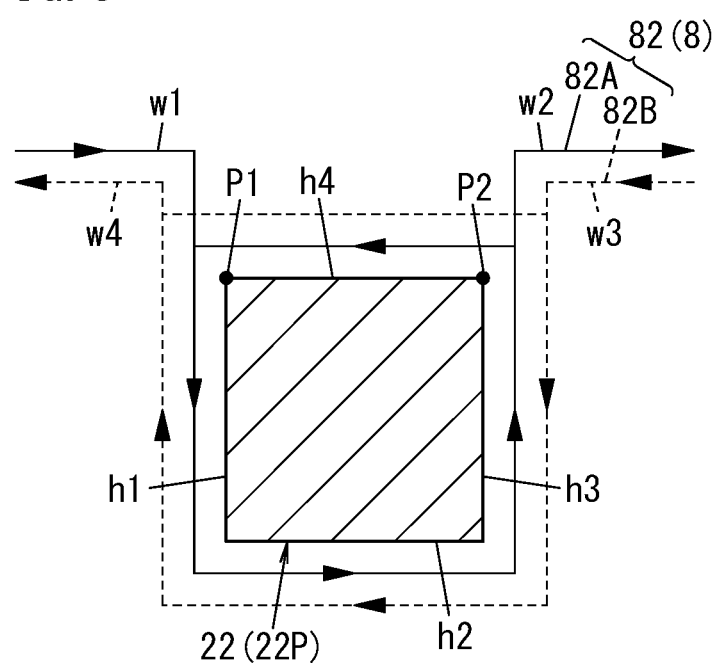
FIG. 5 is a view illustrating how the winding wire is wound around each magnetic pole, where a target number of turns of the winding wire is n.

(2-2) How to Wind Around Magnetic Pole 22 at which Theoretical Value of Turns is Integral Value How to wind the first detection winding wire 82 around each magnetic pole 22 will be described in detail with reference to FIGS. 5 and 6.

In the present embodiment, of the plurality of magnetic poles 22, a magnetic pole 22P (first magnetic pole) at which the theoretical value of the number of turns of the first detection winding wire 82 is n (positive integer) has a target number of turns set to n. In this case, as shown in FIG. 5, the first detection winding wire 82 is wound (n+¾) turns around the magnetic pole 22P with the first winding wire part 82A in the winding direction which is the second turning direction, and is wound a ¾ turn around the magnetic pole 22P with the second winding wire part 82B in the winding direction which is the first turning direction.

That is, when the target number of turns of the first detection winding wire 82 is n, the first winding wire part 82A winds an extra ¾ turn in addition to the target number n of turns, and winding with the second winding wire part 82B cancels the extra ¾ turn. In this way, the target number of turns is substantially adjusted to be n.

Thus, when the first winding wire part 82A is wound around the magnetic pole 22P in the second turning direction, the target number of turns of the first winding wire part 82A around the magnetic pole 22P may be n, but the last one turn of the winding of the first winding wire part 82A around the magnetic pole 22P necessarily ends with a ¾ turn. Also when the second winding wire part 82B is wound around the magnetic pole 22P in the first turning direction, the winding of the second winding wire part 82B around the magnetic pole 22P necessarily ends with a ¾ turn. The "¾" means the division that the numerical value "3" is divided by the numerical value "4".

In the present embodiment, when the first winding wire part 82A is wound around each magnetic pole 22 in the second turning direction, the winding is started in the second turning direction (counterclockwise) from an upper left corner P1 of the cross section of each magnetic pole 22. Therefore, as described above, "the last one turn of the winding of the first winding wire part 82A around the magnetic pole 22P necessarily ends with a ¾ turn" means that at the magnetic pole 22P, the first winding wire part 82A starts winding at the upper left corner P1 of the cross section, turns around three sides (a left side h1, a lower side h2, and a right side h3) of four sides h1 to h4 of the cross section, and ends the winding at an upper right corner P2 of the cross section.

In this case, at the magnetic pole 22P, a connecting wire w2 on a winding end side of the first winding wire part 82A circulates along the annular part 21 in the circumferential direction R1 in the first turning direction (clockwise) to be routed from the upper right corner P2 of the cross section of the magnetic pole 22P to a next magnetic pole 22. Therefore, at the magnetic pole 22P, a connecting wire w1 on a winding start side of the first winding wire part 82A does not cross the connecting wire w2 on the winding end side. This prevents the connecting wire w1 on the winding start side and the connecting wire w2 on the winding end side of the first winding wire part 82A from crossing each other at the magnetic pole 22P and being broken.

Similarly, when the second winding wire part 82B is wound around each magnetic pole 22 in the first turning direction, the winding starts from the upper right corner P2 of the cross-section of each magnetic pole 22 in the first turning direction. Therefore, as described above, "the winding of the second winding wire part 82B around the magnetic pole 22P necessarily ends with a ¾ turn" means that at the magnetic pole 22P, the second winding wire part 82B starts winding at the upper right corner P2 of the cross section, turns around the three sides (the right side h3, the lower side h2, and the left side h1) of the four sides h1 to h4 of the cross section, and ends the winding at the upper left corner P1 of the cross section.

In this case, at the magnetic pole 22P, a connecting wire w4 on a winding end side of the second winding wire part 82B circulates along the annular part 21 in the circumferential direction R1 in the second turning direction to be routed from the upper left corner P1 of the cross section of the magnetic pole 22P to a next magnetic pole 22. Therefore, at the magnetic pole 22P, a connecting wire w3 on a winding start side of the second winding wire part 82B does not cross the connecting wire w4 on the winding end side. This prevents the connecting wire w3 on the winding start side and the connecting wire w4 on the winding end side of the second winding wire part 82B from crossing each other at the magnetic pole 22P and being broken.

(2-3) How to Wind Around Magnetic Pole 22 at which Theoretical Value of Turns Includes Numerical Value at Decimal Place Next, of the plurality of magnetic poles 22, a magnetic pole 22Q at which the theoretical value of the number of turns of the first detection winding wire 82 includes a numerical value at a decimal place (where integer part is n) has a target number of turns set to (n+¾). That is, the target number of turns of the first detection winding wire 82 is set to (n+¾) by approximating the numerical value at the decimal place of the theoretical value to ¾.

Figure 6:
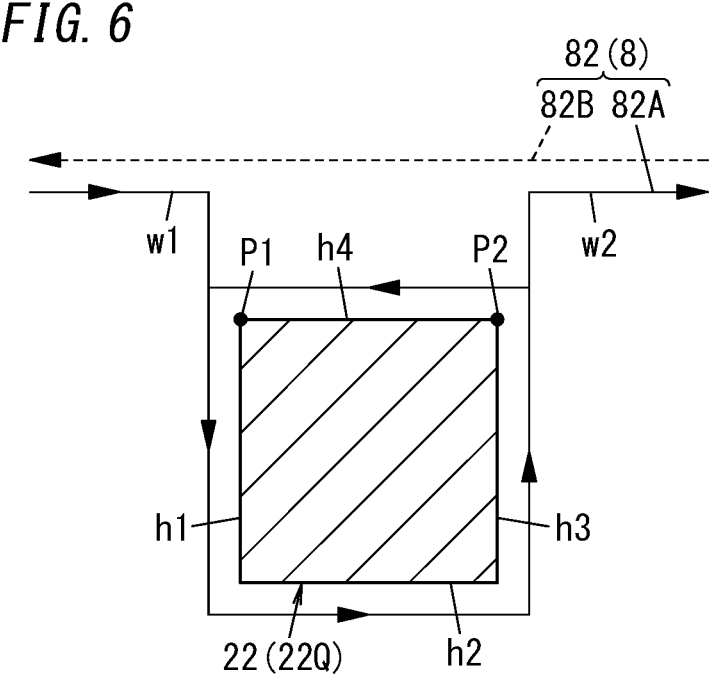
FIG. 6 is a view illustrating how the winding wire is wound around each magnetic pole, where the target number of turns of the winding wire is (n+¾)

In this case, as shown in FIG. 6, the first detection winding wire 82 is wound (n+¾) turns around the magnetic pole 22Q with the first winding wire part 82A in the winding direction which is the second turning direction but is not wound around the magnetic pole 22Q with the second winding wire part 82B. That is, when the target number of turns of the first detection winding wire 82 is (n+¾), the last one turn of the winding of the first winding wire part 82A (winding in the second turning direction) around the magnetic pole 22Q is a ¾ turn without adding the extra ¼ turn.

Therefore, the winding of the second winding wire part 82B (winding in the first turning direction) does not have to cancel the winding of the extra ¼ turn, and thus, the second winding wire part 82B is not wound around the magnetic pole 22Q.

Also in this case, "the last one turn of the winding of the first winding wire part 82A around the magnetic pole 22Q is a ¾ turn" means that at the magnetic pole 22Q, the first winding wire part 82A starts winding at an upper left corner P1 of the cross section, turns around three sides (a left side h1, a lower side h2, and a right side h3) of four sides h1 to h4 of the cross section, and ends the winding at an upper right corner P2 of the cross section as in the case where the target number of turns is n.

In this case, at the magnetic pole 22Q, a connecting wire w2 on a winding end side of the first winding wire part 82A circulates along the annular part 21 in the circumferential direction R1 in the first turning direction to be routed from the upper right corner P2 of the cross section of the magnetic pole 22Q to a next magnetic pole 22. Therefore, at the magnetic pole 22Q, a connecting wire w1 on a winding start side of the first winding wire part 82A does not cross the connecting wire w2 on the winding end side. This prevents the connecting wire w1 on the winding start side and the connecting wire w2 on the winding end side of the first winding wire part 82A from crossing each other at the magnetic pole 22Q and being broken.

As described above, in the present embodiment, while the first winding wire part 82A is wound around each of the plurality of magnetic poles 22 in the second turning direction while being circulated along the alignment of the plurality of magnetic poles 22 in the first turning direction. Thus, when the first winding wire part 82A is wound around each magnetic pole 22 in the second turning direction, the number of turns of the first winding wire part 82A wound around each magnetic pole 22 is adjusted to (n+¾).

That is, for the last turn, the number of turns is adjusted to a ¾ turn. Therefore, at each magnetic pole 22, the connecting wire w1 on the winding start side does not cross the connecting wire w2 on the winding end side of the first winding wire part 82A. This prevents the connecting wire w1 on the winding start side and the connecting wire w2 on the winding end side of the first winding wire part 82A from crossing each other at each magnetic pole 22.

Similarly, the second winding wire part 82B is wound around each of the plurality of magnetic poles 22 in the first turning direction while being circulated along the alignment of the plurality of magnetic poles 22 in the second turning direction. Thus, when the second winding wire part 82B is wound around each magnetic pole 22 in the first turning direction, the number of turns of the second winding wire part 82B wound around each magnetic pole 22 is adjusted to 0 or (¾).

Therefore, at each magnetic pole 22, the connecting wire w3 on the winding start side does not cross the connecting wire w4 on the winding end side of the second winding wire part 82B. This prevents the connecting wire w3 on the winding start side and the connecting wire w4 on the winding end side of the second winding wire part 82B from crossing each other at each magnetic pole 22.

(3) Evaluation of Winding Variation Between First Detection Winding Wire 82 and Second Detection Winding Wire 83 at Each Magnetic Pole 22

The winding is performed such that the number of turns of the winding wire 8 (each of the excitation winding wire 81, the first detection winding wire 82, and the second detection winding wire 83) at each magnetic pole 22 is the target number of turns. In the present embodiment, when the theoretical value of the number of turns includes a numerical value at a decimal place, the target number of turns approximates the numerical value at the decimal place to ¾. Hereinafter, this approximation is referred to as a ¾-approximation method.

In the case where the theoretical value is approximated by the ¾-approximation method and the case where the theoretical value is approximated by approximation methods of Comparative Examples 1 to 3, a winding variation Q between the first detection winding wire 82 and the second detection winding wire 83 at each magnetic pole 22 is evaluated. The winding variation Q is a value (i.e., Q=Q2/Q1×100) obtained by multiplying by 100 an approximate error Q2 of the target number of turns of the second detection winding wire 83 with respect to an approximate error (=target number of turns−theoretical value) Q1 of the target number of turns of the First Detection Winding Wire 82.

Table 1 below shows the theoretical values of the first detection winding wire 82 and the theoretical values of the second detection winding wire 83 at the 0th to 13th magnetic poles 22. In the example shown in Table 1, the total number of turns of the theoretical value of the first detection winding wire 82 around the magnetic poles 22 and the total number of turns of the theoretical value of the second detection winding wire 83 around each magnetic pole 22 are the same. Note that the total number of turns is the sum of absolute values of theoretical values of the number of turns of winding wires at each magnetic pole 22.

For the theoretical values in Table 1, "+" means the number of clockwise turns (turns in the first turning direction), and "−" means the number of anticlockwise turns (turns in the second turning direction). The respective approximation methods (the ¾-approximation method and the approximation methods of Comparative Examples 1 to 3) are applied to the theoretical values of the first detection winding wire 82 and the theoretical values of the second detection winding wire 83 at each magnetic pole 22 of Table 1, thereby obtaining the winding variation Q of each magnetic pole 22.

TABLE 1

| Magnetic Pole No. | Theoretical Value of First Detection Winding Wire | Theoretical Value of Second Detection Winding Wire |
|---|---|---|
| 0 | −99.37 | −11.20 |
| 1 | −84.67 | −53.20 |
| 2 | −53.20 | −84.67 |
| 3 | −11.20 | −99.37 |
| 4 | +33.03 | −94.39 |
| 5 | +70.71 | −70.71 |
| 6 | +94.39 | −33.03 |
| 7 | +99.37 | +11.20 |
| 8 | +84.67 | +53.20 |
| 9 | +53.20 | +84.67 |
| 10 | +11.20 | +99.37 |
| 11 | −33.03 | +94.39 |
| 12 | −70.71 | +70.71 |
| 13 | −94.39 | +33.03 |
| Total Number of Turns | +893.14 | +893.14 |

Figure 7:
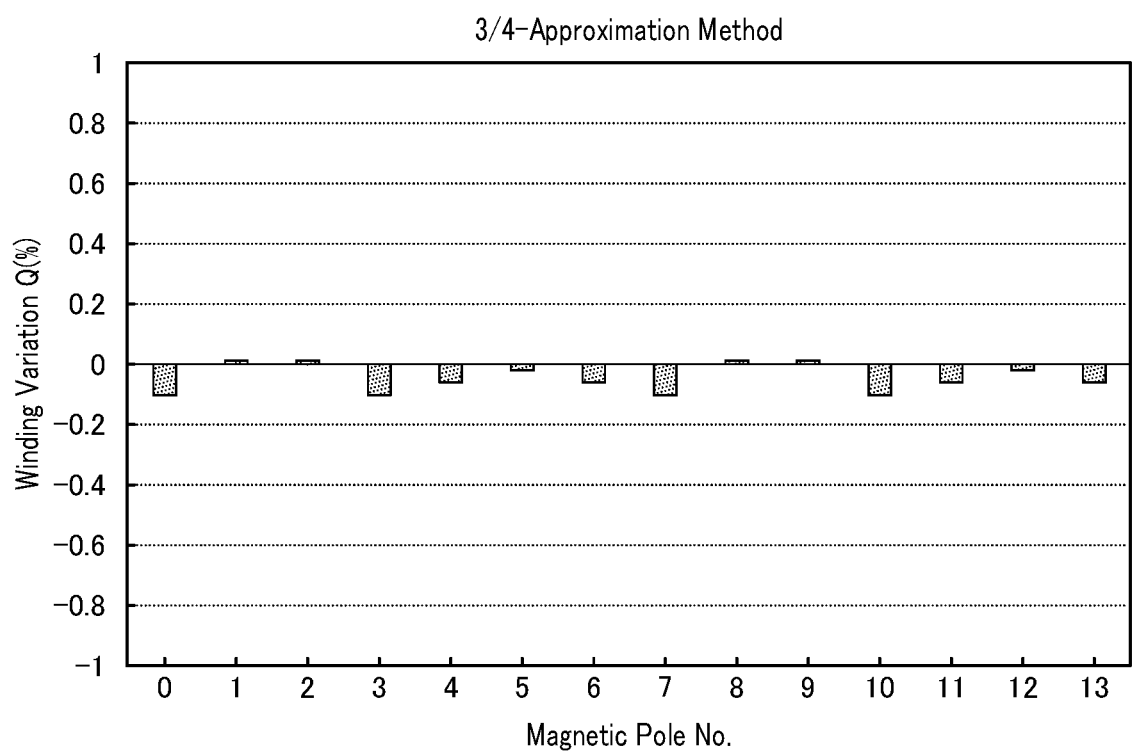
FIG. 7 is a graph of an evaluation result of a winding variation of a first detection winding wire and a second detection winding wire when a ¾-approximation method is applied.

FIG. 7 is a graph showing the winding variation Q of each magnetic pole 22 when the ¾-approximation method is applied to the theoretical value of the first detection winding wire 82 and the theoretical value of the second detection winding wire 83 around each magnetic pole 22 in Table 1.

Figure 8:
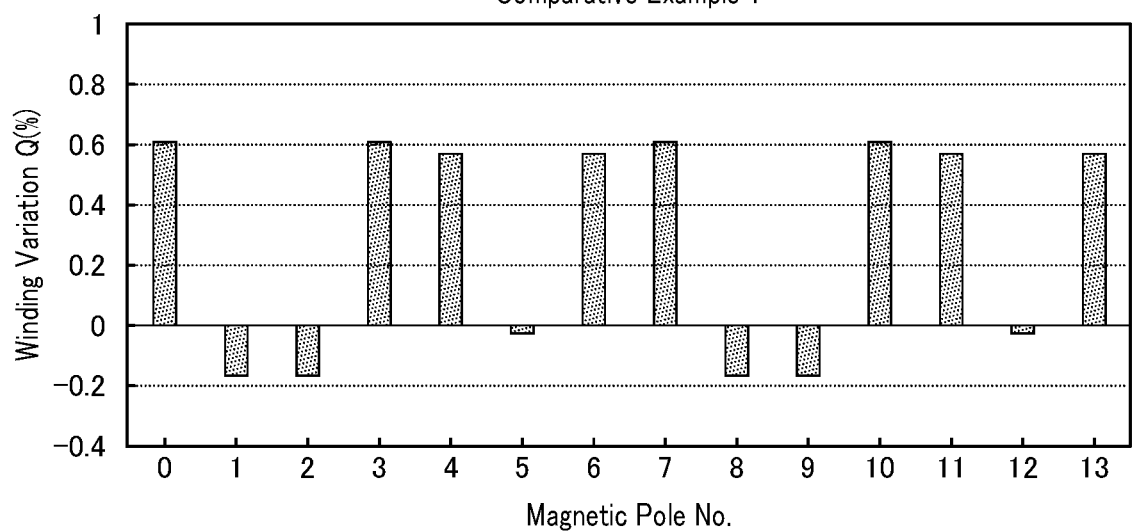
FIG. 8 is a graph of an evaluation result of a winding variation of the first detection winding wire and the second detection winding wire when an approximation method of Comparative Example 1 is applied.

FIG. 8 is a graph showing the winding variation Q of each magnetic pole 22 when the approximation method of Comparative Example 1 is applied to the theoretical value of the first detection winding wire 82 and the theoretical value of the second detection winding wire 83 around each magnetic pole 22 in Table 1. The approximation method of Comparative Example 1 is an approximation in which the numerical value at the first decimal place of the theoretical value is replaced with a nearer one of the digits "0" and "7".

Figure 9:
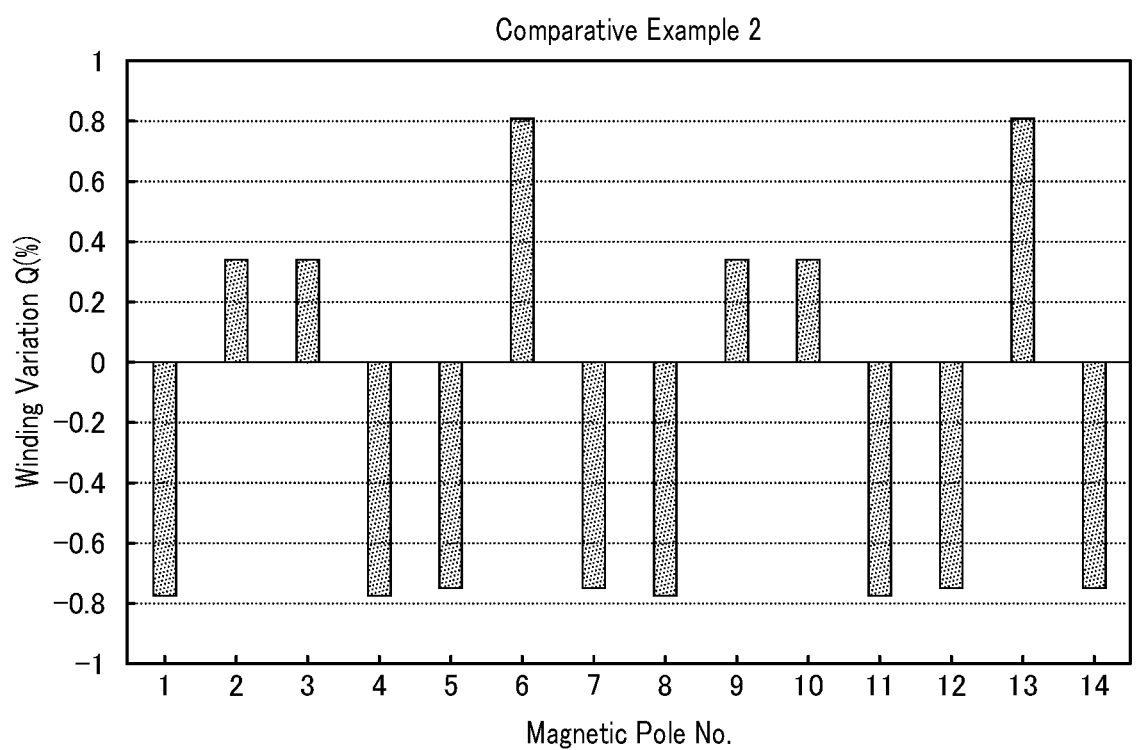
FIG. 9 is a graph of an evaluation result of a winding variation of the first detection winding wire and the second detection winding wire when an approximation method of Comparative Example 2 is applied.

FIG. 9 is a graph showing the winding variation Q of each magnetic pole 22 when the approximation method of Comparative Example 2 is applied to the theoretical value of the first detection winding wire 82 and the theoretical value of the second detection winding wire 83 around each magnetic pole 22 in Table 1. The approximation method of Comparative Example 2 is an approximation in which the numerical value at the first decimal place of the theoretical value is rounded to the nearest integer so that the theoretical value is an integer.

Figure 10:
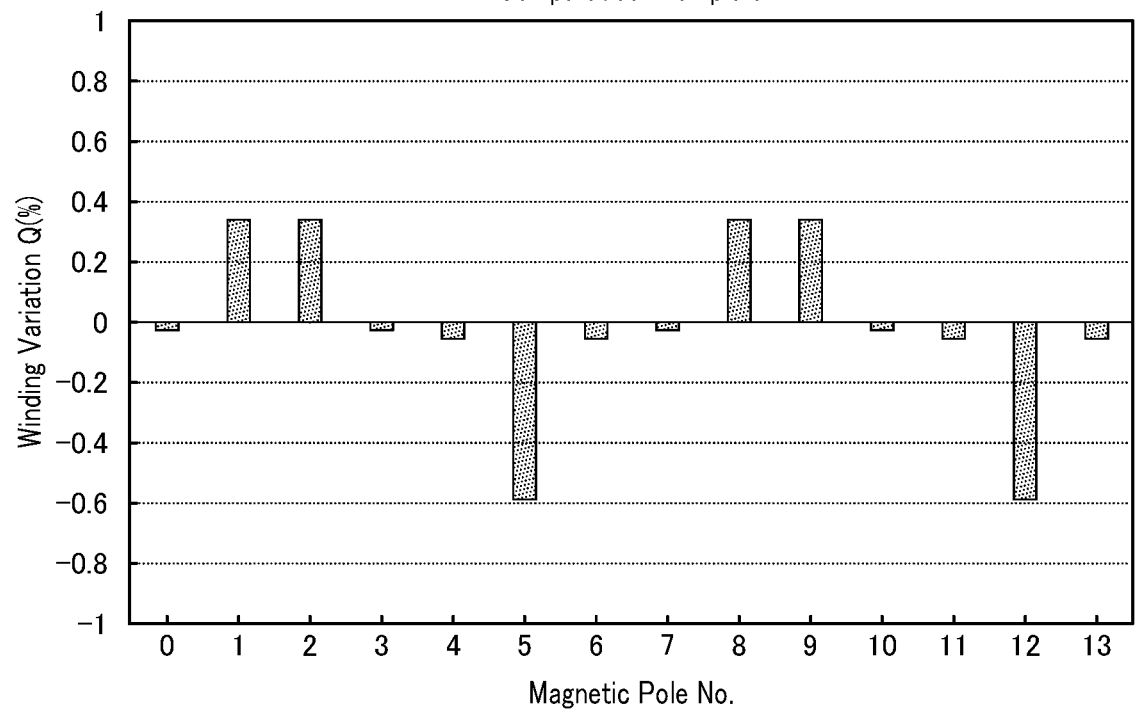
FIG. 10 is a graph of an evaluation result of a winding variation of the first detection winding wire and the second detection winding wire when an approximation method of Comparative Example 3 is applied.

FIG. 10 is a graph showing the winding variation Q of each magnetic pole 22 when the approximation method of Comparative Example 3 is applied to the theoretical value of the first detection winding wire 82 and the theoretical value of the second detection winding wire 83 around each magnetic pole 22 in Table 1. The approximation method of Comparative Example 3 is an approximation in which a numerical value at a decimal place of the theoretical value is rounded down so that the theoretical value is an integer.

The graphs of FIGS. 7 to 10 shows that the ¾-approximation method can reduce the winding variation Q between the first detection winding wire 82 and the second detection winding wire 83 around each magnetic pole 22 as compared to the approximation methods of Comparative Examples 1 to 3. When the winding variation Q at each magnetic pole 22 is large, the actual performance of the resolver stator 1 cannot satisfactorily exhibit the performance represented by the theoretical value. Therefore, the winding variation Q at each magnetic pole 22 is preferably as small as possible. Comparison of FIGS. 7 to 10 with one another shows that the resolver stator 1 of the present embodiment to which the ¾-approximation method is applied actually has higher performance than the resolver stators to which the approximation methods of Comparative Examples 1 to 3 are applied.

(4) Relativity Between First Detection Winding Wire 82 and Second Detection Winding Wire 83

The relativity between the first detection winding wire 82 and the second detection winding wire 83 means that the first detection winding wire 82 and the second detection winding wire 83 have the same electrical characteristics (resistance value R, impedance Z, and inductance L).

For example, in the present embodiment, around each magnetic pole 22, the first detection winding wire 82 is wound at first, and then, the second detection winding wire 83 is wound around the first detection winding wire 82. Therefore, the winding radius of the second detection winding wire 83 at an upper layer is greater than the winding radius of the first detection winding wire 82 at a lower layer, and the total length of the second detection winding wire 83 at the upper layer is greater than the total length of the first detection winding wire 82 at the lower layer.

Thus, the resistance vale R is larger at the second detection winding wire 83 at the higher layer than at the first detection winding wire 82 at the lower layer. In addition, the impedance Z and the inductance L are greater at the first detection winding wire 82 at the lower layer than at the second detection winding wire 83 at the upper layer.

Attention is now focused on the magnetic pole 22P of the plurality of magnetic poles 22. At the magnetic pole 22P, the target number of turns of the first detection winding wire 82 is n (positive integer) (see FIG. 5). For the magnetic pole 22P, the first detection winding wire 82 is wound as described below instead of being wound as described in "(2-3) How to Wind Around Magnetic Pole 22 at Which Theoretical Value of Turns Includes Numerical Value at Decimal Place".

That is, the first detection winding wire 82 is wound (n+m+¾) turns around the magnetic pole 22P with the first winding wire part 82A in the second turning direction and is wound (m+¾) turns around the magnetic pole 22P with the second winding wire part 82B in the first turning direction, where n+m is a positive integer. Thus, adjusting the value of m enables the total length of the first detection winding wire 82 to be adjusted while the target number (n) of turns is maintained. This enables the electrical characteristics (the resistance value R, the impedance Z, and the inductance L) of the first detection winding wire 82 to be adjusted, thereby securing the relativity between the first detection winding wire 82 and the second detection winding wire 83.

The target number of turns is an electromagnetic inductive number of turns. Therefore, for example, the target number of turns is given by defining the number of turns of winding around the magnetic pole 22P in the first turning direction as the "+" number of turns and defining the number of turns of the winding around the magnetic pole 22P in the second turning direction as the "−" number of turns, and by taking the algebraic sum of the "+" number of turns and the "−" number of turns.

In the above description, attention is focused on the magnetic pole 22P at which the target number of turns of the first detection winding wire 82 is n. Here, the target number of turns of the first detection winding wire 82 around the magnetic pole 22P is maintained, while the number of turns of the first detection winding wire 82 is increased. Thus, the total length of the first detection winding wire 82 is adjusted.

In this way, the relativity between the first detection winding wire 82 and the second detection winding wire 83 is secured. Note that alternatively or additionally, attention is focused on a magnetic pole 22 at which the target number of turns of the second detection winding wire 83 is n (positive integer). In the same manner as the above-described case, the total length of the second detection winding wire 83 may be adjusted while maintaining the target number (n) of turns of the second detection winding wire 83 around the magnetic pole 22 to which the attention is focused, thereby securing the relativity between the first detection winding wire 82 and the second detection winding wire 83.

(5) Main Effect

As described above, the resolver stator 1 according to the present embodiment is a resolver stator to be applied to a variable reluctance resolver. The resolver stator 1 includes the plurality of magnetic poles 22, the excitation winding wire 81, the first detection winding wire 82, and the second detection winding wire 83. The plurality of magnetic poles 22 are annularly arranged in an alignment. Each of the excitation winding wire 81, the first detection winding wire 82, and the second detection winding wire 83 is wound around each of the plurality of magnetic poles 22 while being circulated along the alignment of the plurality of magnetic poles 22. One of the clockwise direction and the counterclockwise direction is the first turning direction, and the other of the clockwise direction and the counterclockwise direction is the second turning direction. At least one winding wire 8 of the excitation winding wire 81, the first detection winding wire 82, or the second detection winding wire 83 is wound around each of the plurality of magnetic poles 22 in the second turning direction while being circulated along the alignment of the plurality of magnetic poles 22 in the first turning direction.

With this configuration, the at least one winding wire 8 of the excitation winding wire 81, the first detection winding wire 82, or the second detection winding wire 83 is wound around each of the plurality of magnetic poles 22 in the winding direction which is the second turning direction while being circulated along the alignment of the plurality of magnetic poles 22 in the circulation direction which is the first turning direction. Thus, as described above, the last turn of the winding wire 8 around each magnetic pole 22 ends with a ¾ turn. This enables the connecting wires w1 and w3 on the winding start side of the winding wire 8 to be prevented from respectively crossing the connecting wires w2 and w4 on the winding end side of the winding wire 8 at each magnetic pole 22.

(6) Variations

The variations described below are applicable accordingly in combination. In the variations described below, differences from the embodiment will be mainly described. In the variations described below, the same components as those in the embodiment are denoted by the same reference signs, and the explanation thereof may be omitted.

(6-1) First Variation

In the embodiment, each magnetic pole 22 has a square cross section. However, the cross section of each magnetic pole 22 may have a rectangular shape. In this case, "¾" in the ¾-approximation method means a value obtained by dividing the sum of the lengths of three sides of four sides of the cross section of the magnetic pole 22 by the sum of the lengths of the four sides, the last turn of the winding wire 8 being extended along the three sides.

Note that the cross section of each magnetic pole 22 is not limited to quadrilateral such as the square and the rectangle. For example, the shape of the cross section may be circular or oval. In this case, "¾" of the ¾-approximation method means the value of the length of ¾ of the length of the outer circumference of the cross section.

(6-2) Second Variation

In the embodiment, the first turning direction is clockwise, and the second turning direction is counterclockwise, but the first turning direction may be counterclockwise, and the second turning direction may be clockwise.

(7) Summary

The present specification discloses the following aspects.

A resolver stator (1) of the first aspect is a resolver stator to be applied to a variable reluctance resolver. The resolver stator (1) includes a plurality of magnetic poles (22), an excitation winding wire (81), a first detection winding wire (82), and a second detection winding wire (83). The plurality of magnetic poles (22) are annularly arranged in an alignment. Each of the excitation winding wire (81), the first detection winding wire (82), and the second detection winding wire (83) is wound around each of the plurality of magnetic poles (22) while being circulated along the alignment of the plurality of magnetic poles (22). One of a clockwise direction and a counterclockwise direction is a first turning direction, and the other of the clockwise direction and the counterclockwise direction is a second turning direction. At least one winding wire (8) of the excitation winding wire (81), the first detection winding wire (82), or the second detection winding wire (83) is wound around each of the plurality of magnetic poles (22) in the second turning direction while being circulated along the alignment of the plurality of magnetic poles (22) in the first turning direction.

According to this configuration, the at least one winding wire (8) of the excitation winding wire (81), the first detection winding wire (82), or the second detection winding wire (83) is wound around each of the plurality of magnetic poles (22) in the second turning direction while being circulated along the alignment of the plurality of magnetic poles (22) in the first turning direction (configuration A). Thus, the last turn of the at least one winding wire (8) around each magnetic pole (22) ends with a ¾ turn. This enables a connecting wire (w1 and w3) on a winding start side of the at least one winding wire 8 to be prevented from crossing a connecting wire w2 and w4 on a winding end side of the at least one winding wire 8 at each magnetic pole (22) (Effect B).

In a resolver stator (1) of a second aspect referring to the resolver stator (1) of the first aspect, the at least one winding wire (8) has a first winding wire part (82A) and a second winding wire part (82B). The first winding wire part (82A) is wound around each of the plurality of magnetic poles (22) in the second turning direction while being circulated along the alignment of the plurality of magnetic poles (22) in the first turning direction. The second winding wire part (82B) is wound around each of the plurality of magnetic poles (22)

in the first turning direction while being circulated along the alignment of the plurality of magnetic poles (22) in the second turning direction.

With this configuration, the number of turns around each magnetic pole (22) is given by defining the electromagnetic inductive number of turns around each magnetic pole (22) (the number of turns contributing to electromagnetic induction) as the "+" number of turns (a first number of turns) and defining the number of clockwise turns as the "−" number of turns (a second number of turns), and by taking an algebraic sum of the first number of turns and the second number of turns. Thus, at each magnetic pole (22), the first number of turns of the first winding wire part (82A) may exceed a target number of turns at each magnetic pole (22) due to the configuration A of the first aspect, but the second number of turns of the second winding wire part (82B) cancels the excess. As a result, the effect B is achieved while the target number of turns at each magnetic pole (22) is maintained.

In a resolver stator (1) of a third aspect referring to the resolver stator (1) of the second aspect, the plurality of magnetic poles (22) includes a first magnetic pole (22P) at which a target number of turns of the at least one winding wire (8) is n, where n is a positive integer. The at least one winding wire (8) is wound (n+¾) turns around the first magnetic pole (22P) with the first winding wire part (82A) in the second turning direction and is wound a ¾ turn around the first magnetic pole (22P) with the second winding wire part (82B) in the first turning direction.

With this configuration, when the target number of turns of the at least one winding wire (8) around the first magnetic pole (22P) is n, the effect B is achieved while the target number of turns at the first magnetic pole (22P) is maintained.

In a resolver stator (1) of a fourth aspect referring to the resolver stator (1) of the second aspect, the plurality of magnetic poles (22) includes a first magnetic pole (22Q) at which a target number of turns of the at least one winding wire (8) is (n+¾), where n is a positive integer. The at least one winding wire (8) is wound (n+¾) turns around the first magnetic pole (22Q) with the first winding wire part (82A) in the second turning direction and is not wound around the first magnetic pole (22Q) with the second winding wire part (82B).

With this configuration, when the target number of turns of the at least one winding wire (8) around the first magnetic pole (22Q) is (n+¾), the effect B is achieved simply by winding the first winding wire part (82A) (n+¾) turns around the first magnetic pole (22Q) without winding the second winding wire part (82B) around the first magnetic pole (22Q).

In the resolver stator (1) of a fifth aspect referring to the resolver stator (1) of the second aspect, the plurality of magnetic poles (22) include a first magnetic pole (22P) at which a target number of turns of the at least one winding wire (8) of the first detection winding wire (82) or the second detection winding wire (83) is n, where n is a positive integer. The at least one winding wire (8) is wound (n+m+¾) turns around the first magnetic pole (22P) with the first winding wire part (82A) in the second turning direction and is wound (m+¾) turns around the first magnetic pole (22P) with the second winding wire part (82B) in the first turning direction, where m is a positive integer.

With this configuration, when the target number of turns of the at least one winding wire (8) around the first magnetic pole (22P) is n, freely adjusting the value of m enables the total length of the at least one winding wire (8) to be freely adjusted while maintaining the target number of turns is maintained. Thus, the electric characteristics (resistance, impedance, inductance, and the like) of the at least one winding wire (8) are adjustable while the target number of turns is maintained.

In particular, setting the entirety of the first detection winding wire (82) and the entirety of the entirety of the second detection winding wire (83) to have the same electric characteristics enables the relativity between the entirety of the first detection winding wire (82) and the entirety of the second detection winding wire (83) to be secured while the target number of turns is maintained. Alternatively, setting the first detection winding wire (82) and the second detection winding wire (83) to have the same electric characteristics at the first magnetic pole (22P) enables the relativity between the first detection winding wire (82) and the second detection winding wire (83) at the first magnetic pole (22P) to be secured while the target number of turns is maintained.

In a resolver stator (1) of a sixth aspect referring to the resolver stator (1) of any one of the first to fifth aspects, the at least one winding wire (8) is circulated along the alignment of the plurality of magnetic poles (22) in the first turning direction from a first magnetic pole (0th magnetic pole 22) to a last magnetic pole (13th magnetic pole 22) of the plurality of magnetic poles (22) and is not circulated back to the first magnetic pole from the last magnetic pole in the first turning direction.

With this configuration, the at least one winding wire (8) does not form a closed ring along the alignment of the plurality of magnetic poles (22). This prevents induced electromotive force due to a closed ring formed by the at least one winding wire (8) along the alignment of the plurality of magnetic poles (22) from being generated. As a result, the induced electromotive force is prevented from affecting respective output signals of the first detection winding wire (82) and the second detection winding wire (83).

In a resolver stator (1) of a seventh aspect referring to the resolver stator (1) of any one of the first to sixth aspects, the at least one winding wire (8) includes excitation winding wire (81), a first detection winding wire (82), and a second detection winding wire (83).

With this configuration, the effect of each of the first to seventh aspects are achieved by each of the excitation winding wire (81), the first detection winding wire (82), and the second detection winding wire (83).

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. A resolver stator to be applied to a variable reluctance resolver, the resolver stator comprising:
   a plurality of magnetic poles annularly arranged in an alignment;
   an excitation winding wire;
   a first detection winding wire; and
   a second detection winding wire,
   each of the excitation winding wire, the first detection winding wire, and the second detection winding wire being wound around each of the plurality of magnetic poles while being circulated along the alignment of the plurality of magnetic poles, with respect to a circumferential direction of the stator:
one of a clockwise direction and a counterclockwise direction being a first turning direction,
the other of the clockwise direction and the counterclockwise direction being a second turning direction, and
at least one of the excitation winding wire, the first detection winding wire, and the second detection winding wire being wound around each of the plurality of magnetic poles in the second turning direction while being circulated along the alignment of the plurality of magnetic poles in the first turning direction.

2. The resolver stator of claim 1, wherein
the at least one of the excitation winding wire, the first detection winding wire, and the second detection winding wire has:
a first winding wire part wound around each of the plurality of magnetic poles in the second turning direction while being circulated along the alignment of the plurality of magnetic poles in the first turning direction and
a second winding wire part wound around each of the plurality of magnetic poles in the first turning direction while being circulated along the alignment of the plurality of magnetic poles in the second turning direction.

3. The resolver stator of claim 2, wherein
the plurality of magnetic poles includes a first magnetic pole at which a target number of turns of the at least one of the excitation winding wire, the first detection winding wire, and the second detection winding wire is n, where n is a positive integer, and
the at least one of the excitation winding wire, the first detection winding wire, and the second detection winding wire is wound (n+¾) turns around the first magnetic pole with the first winding wire part in the second turning direction and is wound a ¾ turn around the first magnetic pole with the second winding wire part in the first turning direction.

4. The resolver stator of claim 2, wherein
the plurality of magnetic poles include a first magnetic pole at which a target number of turns of the at least one of the excitation winding wire, the first detection winding wire, and the second detection winding wire is (n+¾), where n is a positive integer, and
the at least one of the excitation winding wire, the first detection winding wire, and the second detection winding wire is wound (n+¾) turns around the first magnetic pole with the first winding wire part in the second turning direction and is not wound around the first magnetic pole with the second winding wire part.

5. The resolver stator of claim 2, wherein
the plurality of magnetic poles include a first magnetic pole at which a target number of turns of at least one of the first detection winding wire and the second detection winding wire is n, where n is a positive integer, and
the at least one of the excitation winding wire, the first detection winding wire, and the second detection winding wire is wound (n+m+¾) turns around the first magnetic pole with the first winding wire part in the second turning direction and is wound (m+¾) turns around the first magnetic pole with the second winding wire part in the first turning direction, where m is a positive integer.

6. The resolver stator of claim 1, wherein
the at least one of the excitation winding wire, the first detection winding wire, and the second detection winding wire;
is circulated along the alignment of the plurality of magnetic poles in the first turning direction from a first magnetic pole to a last magnetic pole of the plurality of magnetic poles, and
is not circulated back to the first magnetic pole from the last magnetic pole in the first turning direction.

7. The resolver stator of claim 1, wherein
the at least one of the excitation winding wire, the first detection winding wire, and the second detection winding wire includes all of the excitation winding wire, the first detection winding wire, and the second detection winding wire.

* * * * *